(12) United States Patent
Kato

(10) Patent No.: US 7,239,361 B2
(45) Date of Patent: Jul. 3, 2007

(54) DISPLAY

(75) Inventor: Yoshifumi Kato, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 0 days.

(21) Appl. No.: 11/269,039

(22) Filed: Nov. 7, 2005

(65) Prior Publication Data

US 2006/0050201 A1 Mar. 9, 2006

Related U.S. Application Data

(62) Division of application No. 10/356,232, filed on Jan. 31, 2003, now Pat. No. 7,084,936.

(30) Foreign Application Priority Data

Jan. 31, 2002 (JP) .............................. 2002-024643

(51) Int. Cl.
*G02F 1/1335* (2006.01)
*H01J 29/10* (2006.01)

(52) U.S. Cl. ........................... 349/69; 349/74; 313/463

(58) Field of Classification Search ................ 349/69, 349/74; 313/463
See application file for complete search history.

(56) References Cited

U.S. PATENT DOCUMENTS

| | | | |
|---|---|---|---|
| 4,772,885 A | 9/1988 | Uehara et al. ................ 349/71 |
| 5,661,371 A | 8/1997 | Salerno .................... 315/169.3 |
| 6,507,379 B1 | 1/2003 | Yokoyama et al. ........... 349/69 |
| 2003/0071935 A1* | 4/2003 | Maeda ......................... 349/69 |
| 2006/0114371 A1* | 6/2006 | Peterson et al. .............. 349/61 |

FOREIGN PATENT DOCUMENTS

| | | |
|---|---|---|
| JP | 60-054174 | 3/1985 |
| JP | 08-211832 | 8/1996 |
| JP | 2000-075809 | 3/2000 |
| JP | 3074735 | 8/2000 |
| JP | 2000-267097 | 9/2000 |
| JP | 2001-092390 | 4/2001 |
| JP | 2001-209345 | 8/2001 |
| JP | 2001-305529 | 10/2001 |
| JP | 2003-098984 | 4/2003 |

* cited by examiner

*Primary Examiner*—Toan Ton
(74) *Attorney, Agent, or Firm*—Morgan & Finnegan, L.L.P.

(57) ABSTRACT

A display includes a display surface, an electroluminescent panel, which has a plurality of electroluminescent elements, and a liquid crystal panel, which has a plurality of liquid crystal elements. The liquid crystal panel and the electroluminescent panel overlaps each other in the front and rear direction of the display. The electroluminescent elements and the liquid crystal elements are aligned with each other in the front and rear direction of the display. In the display, at least one of the electroluminescent elements and the liquid crystal elements function as pixels to show an image on the display surface. Therefore, the display can show an image in the appropriate manner in accordance with an environment.

2 Claims, 4 Drawing Sheets

DISPLAY

BACKGROUND OF THE INVENTION

This application claims priority and is a divisional of U.S. patent application Ser. No. 10/356,232 filed on Jan. 31, 2003 now U.S. Pat. No. 7,084,936.

The present invention relates to a display that is a combination of a liquid crystal panel and an electroluminescent panel.

Liquid crystal displays are classified into reflective type and transmissive type depending on the lighting system. A transmissive liquid crystal display has a higher image quality than a reflective liquid crystal display but has a drawback that the power consumption is great. On the other hand, a reflective liquid crystal display has small power consumption but has a drawback that the image quality is insufficient under an environment where the lighting intensity is not enough.

An organic electroluminescent display has been proposed as a display having superior display performance. However, the organic electroluminescent display also has a drawback that the image quality is insufficient under an environment where the lighting intensity is high such as the outdoors.

Japanese Laid-Open Patent Publication No. 2000-267097 discloses a display that is a combination of a liquid crystal panel and an organic electroluminescent panel. However, the organic electroluminescent panel only functions as a front light.

SUMMARY OF THE INVENTION

Accordingly, it is an objective of the present invention to provide a display that functions in accordance with the environment.

To achieve the above objective, the present invention provides a display, which includes a display surface, an electroluminescent panel, and a liquid crystal panel. The electroluminescent panel has a plurality of electroluminescent elements. The liquid crystal panel overlaps the electroluminescent panel in a front and rear direction of the display. The liquid crystal panel includes a plurality of liquid crystal elements. The electroluminescent elements and the liquid crystal elements are aligned with each other in the front and rear direction of the display. At least one of the electroluminescent elements and the liquid crystal elements function as pixels to show an image on the display surface.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 4.

Figure 1:
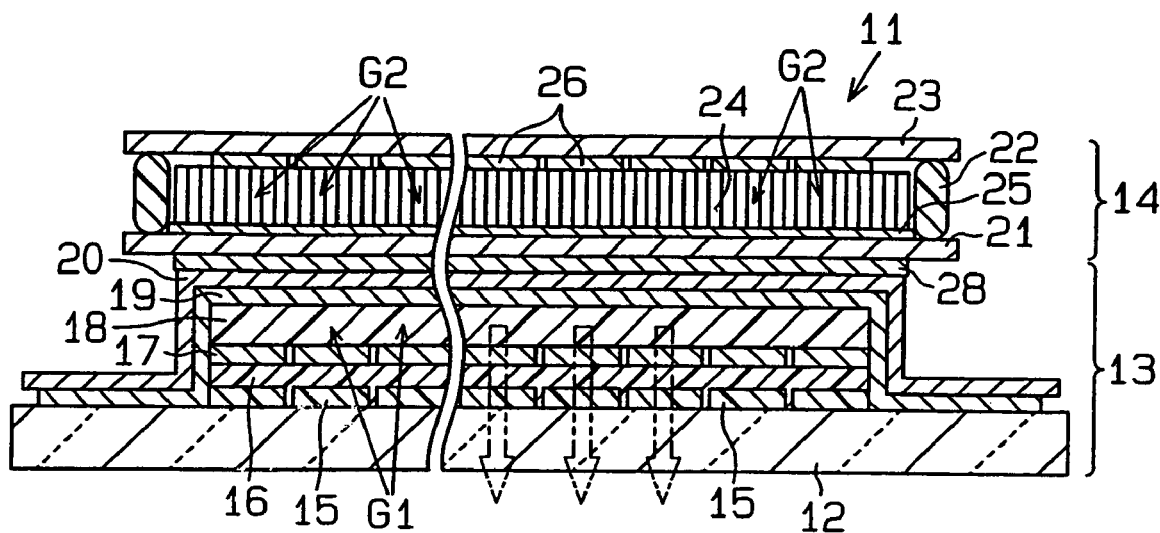
FIG. 1 is a partial schematic cross-sectional view illustrating a display according to a first embodiment of the present invention.

As shown in FIG. 1, a display 11 according to the first embodiment has an electroluminescent panel 13 and a liquid crystal panel 14, which is located at the rear of the electroluminescent panel 13. In the first embodiment, the front surface (lower surface as viewed in FIG. 1) of the electroluminescent panel 13 serves as a display surface. The drive systems of the electroluminescent panel 13 and the liquid crystal panel 14 are both passive matrix systems.

The electroluminescent panel 13 has a first substrate 12, which is made of glass and transparent. Color filters 15 are located on the surface of the first substrate 12 that faces the liquid crystal panel 14 to form a stripe. The color filters 15 extend parallel to each other. A transparent planarizing layer 16 covers the color filters 15.

First anodes 17 are located on the surface of the planarizing layer 16 that faces the liquid crystal panel 14 to form a stripe. The first anodes 17 extend parallel to each other and the lengthwise direction of the color filters 15. Each first anode 17 is aligned with one of the color filters 15 in the front and rear direction of the display 11 (vertical direction as viewed in FIG. 1). The first anodes 17 are made of transparent material such as indium-tin oxide (ITO), which passes light.

A thin-film organic layer 18 is located on the surfaces of the first anodes 17 that face the liquid crystal panel 14. The organic layer 18 is made of organic electroluminescent material and transparent. More specifically, the organic layer 18 consists of a hole injection layer, a hole transport layer, a light-emitting layer, and an electron transport layer, which are arranged from the first anodes 17 toward the liquid crystal panel 14 in this order.

First cathodes 19 are located on the surface of the organic layer 18 that faces the liquid crystal panel 14. The first cathodes 19 extend parallel to each other and perpendicular to the first anodes 17. The first cathodes 19 are formed of transparent material such as indium-tin oxide (ITO), which passes light.

A transparent sealing film 20 is located on the surfaces of the first cathodes 19 that face the liquid crystal panel 14. The sealing film 20 isolates the organic layer 18 from the outside. A polarizing plate 28 is located on the surface of the sealing film 20 that faces the liquid crystal panel 14.

Parts of the organic layer 18 that are sandwiched between the first anodes 17 and the first cathodes 19 correspond to electroluminescent elements (organic light-emitting diode) G1. In other words, each electroluminescent element G1 is formed at the intersecting portion between one of the first anodes 17 and one of the first cathodes 19. The electroluminescent elements G1 are arranged in a matrix. Each electroluminescent element G1 overlaps one of the color filters 15 in the front and rear direction of the display 11.

Each electroluminescent element G1 is driven in accordance with an electric field that acts on the electroluminescent element G1 by the application of D.C. voltage to the corresponding first anode 17 and the corresponding first cathode 19. When a predetermined voltage is applied to one of the first anodes 17 and one of the first cathodes 19, an electric field having the intensity that corresponds to the applied voltage acts on the corresponding electroluminescent element G1, which causes the electroluminescent element G1 to emit white light.

Voltage is applied to the first anodes 17 and the first cathodes 19 by a drive apparatus, which is not shown. The drive apparatus is controlled by a controller, which is not shown.

The liquid crystal panel 14 has a second substrate 21 and a third substrate 23, which face each other with a space formed in between. The second substrate 21 is made of glass and transparent. The second substrate 21 is located on the polarizing plate 28 and is closer to the electroluminescent panel 13 than the third substrate 23.

A sealing material 22 and a liquid crystal 24 are located between the second substrate 21 and the third substrate 23. The sealing material 22 surrounds the periphery of the liquid crystal 24 to isolate the liquid crystal 24 from the outside.

Second cathodes 25 are located on the surface of the second substrate 21 that faces the third substrate 23 to form a stripe. The second cathodes 25 extend parallel to each other. Each second cathode 25 is aligned with one of the first cathodes 19 of the electroluminescent panel 13 in the front and rear direction of the display 11. The second cathodes 25 are made of transparent material such as indium-tin oxide (ITO), which passes light.

Second anodes 26 are located on the surface of the third substrate 23 that faces the second substrate 21 to form a stripe. The second anodes 26 extend parallel to each other and perpendicular to the second cathodes 25. Each second anode 26 is aligned with one of the first anodes 17 of the electroluminescent panel 13 in the front and rear direction of the display 11. The second anodes 26 are made of opaque material such as metal (for example, aluminum) and reflect light.

Portions of the liquid crystal 24 sandwiched between the second cathodes 25 and the second anodes 26 correspond to liquid crystal elements G2. In other words, each liquid crystal element G2 is formed at an intersecting portion between one of the second cathodes 25 and one of the second anodes 26. The liquid crystal elements G2 are arranged in a matrix. Each liquid crystal element G2 is aligned with one of the electroluminescent elements G1 and overlaps one of the color filters 15 in the front and rear direction of the display 11.

Each liquid crystal element G2 is driven in accordance with an electric field that acts on the liquid crystal element G2 by the application of D.C. voltage to the corresponding second cathode 25 and the corresponding second anode 26. When a predetermined voltage is applied to one of the second cathodes 25 and one of the second anodes 26, an electric field having the intensity that corresponds to the applied voltage acts on the corresponding liquid crystal element G2, which causes the arrangement of the liquid crystal molecules of the liquid crystal element G2 to vary in a reversible manner. The liquid crystal element G2 passes light when the electric field is not applied, and blocks light when the electric field is applied. In the drawing, the liquid crystal elements G2 that are in a light-transmitting state are shown in white solid color and liquid crystal elements G2 that are in a light-blocking state are shown in stripes.

Voltage is applied to the second cathodes 25 and the second anodes 26 by a drive apparatus, which is not shown. The operation of the drive apparatus is controlled by a controller, which is not shown.

Operations of the display 11 will be described with reference to FIGS. 2 to 4.

Figure 2:
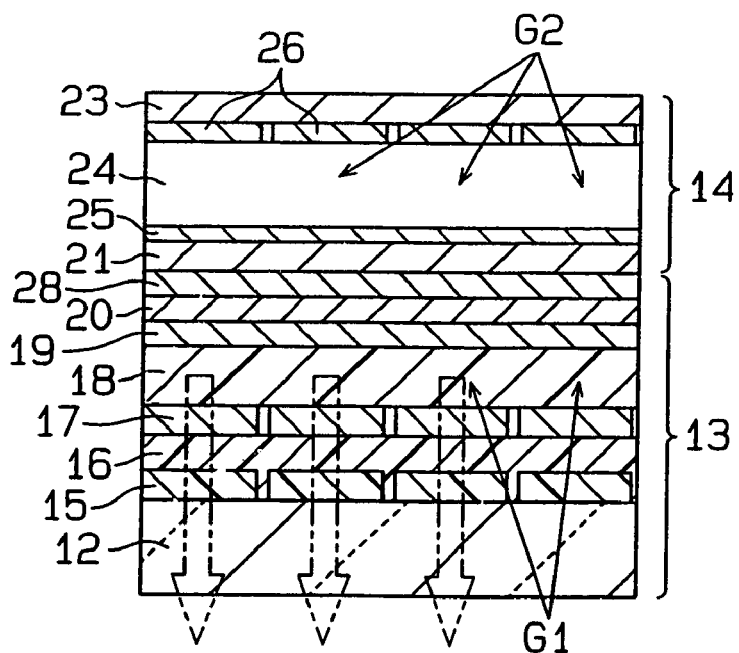
FIG. 2 is a partial cross-sectional view explaining the operation of a display shown in FIG. 1 in a first operation mode.

FIG. 2 shows a first operation mode (EL operation mode) of the display 11, in which the electroluminescent elements G1 function as pixels. In the first operation mode, the display 11 utilizes light emitted from the electroluminescent elements G1 as a light source.

In the first operation mode, a predetermined voltage is selectively applied to each of the first anodes 17 and each of the first cathodes 19. The electroluminescent element G1 that is located at the intersecting portion between the first anode 17 and the first cathode 19 to which voltage is applied emits white light. The light emitted from the electroluminescent element G1 is radiated toward the color filter 15 that overlaps the electroluminescent element G1 in the front and rear direction of the display 11. The light emitted from the electroluminescent element G1 is converted into either red, green, or blue by the color filter 15, and is sent out from the display surface (see arrows described in chain-double dashed lines shown in FIG. 2).

When the display 11 is operating in the first operation mode, the liquid crystal elements G2 may be maintained in either the light-transmitting state or the light-blocking state. When the liquid crystal elements G2 are maintained in the light-blocking state, that is, when a predetermined voltage is applied to all the second cathodes 25 and all the second anodes 26, the display 11 displays a high contrast image on the display surface.

Figure 3:
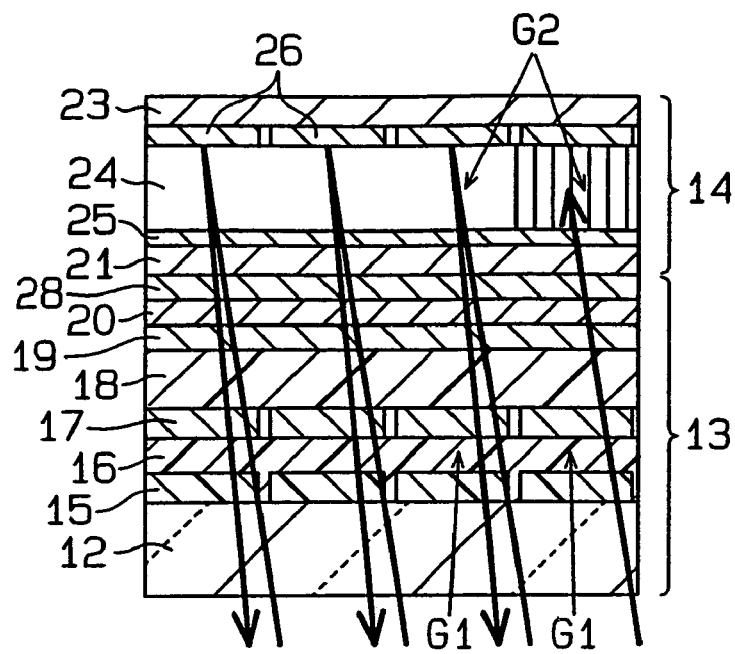
FIG. 3 is a partial cross-sectional view explaining the operation of a display shown in FIG. 1 in a second operation mode.

FIG. 3 shows a second operation mode (liquid crystal operation mode) of the display 11, in which the liquid crystal elements G2 function as pixels. In the second operation mode, the display 11 utilizes outside light as a light source.

In the second operation mode, a predetermined voltage is selectively applied to each of the second cathodes 25 and each of the second anodes 26. The liquid crystal element G2 that is located at the intersecting portion between the second cathode 25 and the second anode 26 to which voltage is applied is switched to block light.

The outside light that enters the display 11 via the display surface is transmitted through the liquid crystal 24 only at portions corresponding to the liquid crystal elements G2 that are in the light-transmitting state. The outside light that has passed through the liquid crystal 24 reaches the second anodes 26 and is reflected by the second anodes 26. The reflected light is converted into either red, green, or blue by the color filters 15 and sent out from the display surface (see arrows described in heavy lines shown in FIG. 3).

When the display 11 is operating in the second operation mode, the electroluminescent elements G1 are kept in a non-light-emitting state. That is, no voltage is applied to the first anodes 17 and the first cathodes 19.

Figure 4:
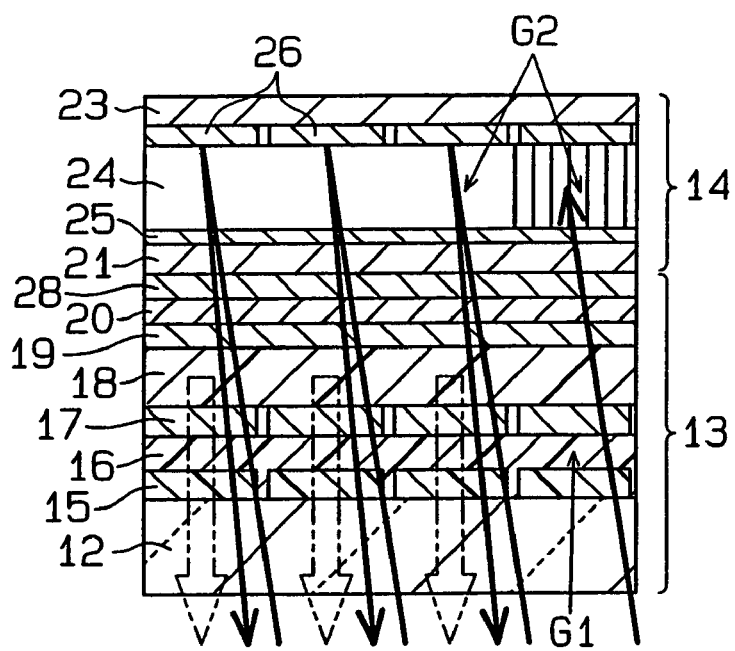
FIG. 4 is a partial cross-sectional view explaining the operation of a display shown in FIG. 1 in a third operation mode.

FIG. 4 shows a third operation mode of the display 11, in which both electroluminescent elements G1 and the liquid crystal elements G2 function as pixels. In the third operation mode, the display 11 utilizes both the light emitted from the electroluminescent elements G1 and the outside light as a light source.

In the third operation mode, a predetermined voltage is selectively applied to each of the first anodes 17 and each of the first cathodes 19. Simultaneously, a predetermined voltage is applied to the second cathode 25 and the second anode 26 that correspond to the liquid crystal element G2 aligned with the electroluminescent element G1 that is in the non-light-emitting state in the front and rear direction of the display 11.

The outside light that enters the display 11 via the display surface and light that leaks toward the rear side of the display 11 (upward as viewed in FIG. 4) from the electroluminescent elements G1 are transmitted through the liquid crystal 24 at only the portions corresponding to the liquid crystal elements G2 that are in the light-transmitting state. The lights then reach the second anodes 26 and are reflected by the second anodes 26. The reflected light and the light emitted from the electroluminescent elements G1 are converted into either red, green, or blue at the color filters 15 and sent out from the display surface (see arrows described in chain double-dashed lines and heavy lines in FIG. 4).

The present invention provides the following advantages.

In the first operation mode, the display 11 utilizes light emitted from the electroluminescent elements G1 as a light source. Therefore, the display 11 indicates an image that is easily visible on the display surface although the display 11 is used under an environment where the lighting intensity is insufficient such as the indoors or at night.

In the second operation mode, the display 11 utilizes the outside light as a light source. Therefore, the display 11 reduces power consumption under an environment where the lighting intensity is sufficient such as the outdoors.

In the third operation mode, the display 11 utilizes both the light emitted from the electroluminescent elements G1 and the outside light as a light source. Therefore, the display 11 shows a bright and high-contrast image that is easily visible on the display surface under an environment where the lighting intensity is high.

The electroluminescent elements G1 are aligned with the liquid crystal elements G2 in the front and rear direction of the display 11. Therefore, when operated in the third operation mode, the display 11 shows a bright and high-contrast image on the display surface using both the light emitted from the electroluminescent elements G1 and the outside light as a light source.

Since the display 11 has the color filters 15, the display 11 shows a colored image on the display surface.

The display 11 is easily manufactured by overlapping the electroluminescent panel 13 with the liquid crystal panel 14.

The electroluminescent panel 13 is located closer to the display surface than the liquid crystal panel 14. This reduces the amount of light decreased from when the light is emitted from the electroluminescent elements G1 until when the light reaches the display surface. Thus, the display 11 is particularly suitable for purposes that utilize the light emitted from the electroluminescent elements G1 as a light source. That is, the display 11 is particularly suitable for usage under an environment where the lighting intensity is insufficient such as the indoors or at night.

A second embodiment of the present invention will now be described with reference to FIGS. 5 to 8. Like or the same reference numerals are given to those components that are like or the same as the corresponding components of the first embodiment.

Figure 5:
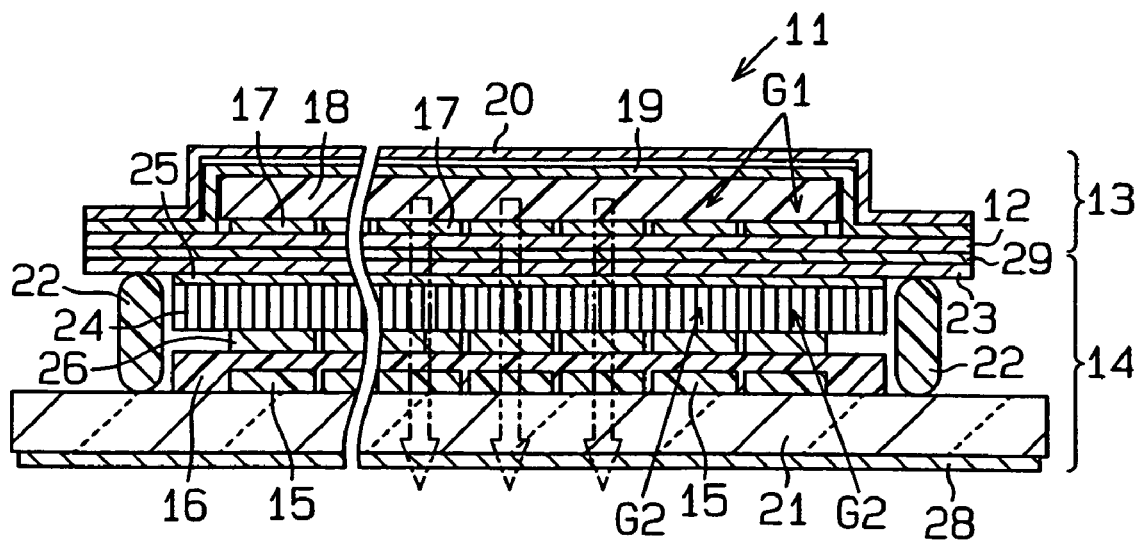
FIG. 5 is a partial schematic cross-sectional view illustrating a display according to a second embodiment of the present invention.

As shown in FIG. 5, the display 11 according to the second embodiment has the liquid crystal panel 14 and the electroluminescent panel 13, which is located at the rear of the liquid crystal panel 14. In the second embodiment, the front surface (lower surface as viewed in FIG. 5) of the liquid crystal panel 14 serves as a display surface. The drive systems of the electroluminescent panel 13 and the liquid crystal panel 14 are both passive matrix systems.

The liquid crystal panel 14 has the second substrate 21 and the third substrate 23, which face each other with a space formed in between. The second substrate 21 and the third substrate 23 are adhered to each other by the sealing material 22. The second substrate 21 and the third substrate 23 are made of glass and transparent. The third substrate 23 is located closer to the electroluminescent panel 13 than the second substrate 21.

The color filters 15 are located on the surface of the second substrate 21 that faces the third substrate 23 to form a stripe. The color filters 15 extend parallel to each other. The transparent planarizing layer 16 covers the color filters 15.

The second anodes 26 are located on the planarizing layer 16 that faces the third substrate 23 to form a stripe. The second anodes 26 extend parallel to each other and the lengthwise direction of the color filters 15. Each second anode 26 is aligned with one of the color filters 15 in the front and rear direction of the display 11 (vertical direction as viewed in FIG. 5). The second anodes 26 are made of transparent material such as indium-tin oxide (ITO), which passes light.

The second cathodes 25 are located on the surface of the third substrate 23 that faces the second substrate 21 to form a stripe. The second cathodes 25 extend parallel to each other and perpendicular to the second anodes 26. The second cathodes 25 are formed of transparent material such as indium-tin oxide (ITO), which passes light.

The liquid crystal 24 is located between the second cathodes 25 and the second anodes 26. The sealing material 22 surrounds the periphery of the liquid crystal 24 to isolate the liquid crystal 24 from the outside.

The polarizing plate 28 is located on the surface of the second substrate 21 that faces the front side (downward as viewed in FIG. 5) of the display 11. Another polarizing plate 29 is located on the surface of the third substrate 23 that faces the electroluminescent panel 13.

Parts of the liquid crystal 24 that are sandwiched between the second cathodes 25 and the second anodes 26 correspond to the liquid crystal elements G2. The liquid crystal elements G2 are arranged in a matrix. Each liquid crystal element G2 overlaps one of the color filters 15 in the front and rear direction of the display 11.

The electroluminescent panel 13 has the first substrate 12. The first substrate 12 is made of glass and transparent. The first anodes 17 are located on the surface of the first substrate 12 that faces the rear side (upward as viewed in FIG. 5) of the display 11 to form a stripe. The first anodes 17 extend parallel to each other. Each first anode 17 is aligned with one of the second anodes 26 of the liquid crystal panel 14 in the front and rear direction of the display 11. The first anodes 17 are made of transparent material such as indium-tin oxide (ITO), which passes light.

The thin-film organic layer 18 is located on the surfaces of the first anodes 17 that face the rear side of the display 11. The organic layer 18 is made of organic electroluminescent material and transparent. The organic layer 18 consists of a hole injection layer, a hole transport layer, a light-emitting layer, and an electron transport layer, which are arranged from the first anodes 17 toward the rear side of the display 11 in this order.

The first cathodes 19 are located on the surface of the organic layer 18 that faces the rear side of the display 11. The first cathodes 19 extend parallel to each other and perpendicular to the first anodes 17. Each first cathode 19 is aligned with one of the second cathodes 25 in the front and rear direction of the display 11. The first cathodes 19 are made of opaque material such as metal (for example, aluminum) and reflect light.

The sealing film 20 is located on the surfaces of the first cathodes 19 that face the rear side of the display 11. The sealing film 20 isolates the organic layer 18 from the outside.

Parts of the organic layer 18 that are sandwiched between the first anodes 17 and the first cathodes 19 correspond to the electroluminescent elements G1. The electroluminescent elements G1 are arranged in a matrix. Each electroluminescent element G1 is aligned with one of the liquid crystal elements G2 and overlaps one of the color filters 15 in the front and rear direction of the display 11.

Operations of the display 11 according to the second embodiment will be described with reference to FIGS. 6 to 8.

Figure 6:
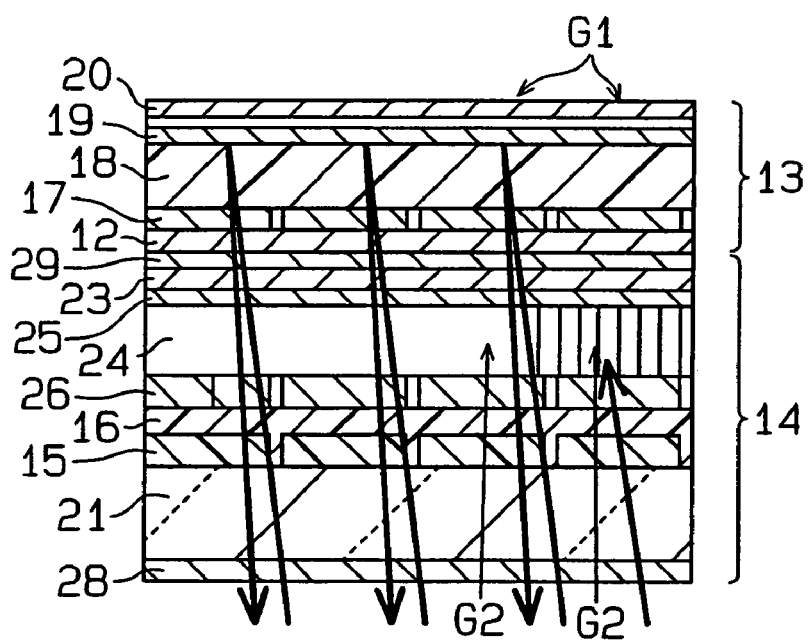
FIG. 6 is a partial cross-sectional view explaining the operation of a display shown in FIG. 5 in a fourth operation mode.

FIG. 6 shows a fourth operation mode (liquid crystal operation mode) of the display 11, in which the liquid crystal elements G2 function as pixels. In the fourth operation mode, the display 11 utilizes the outside light as a light source.

In the fourth operation mode, a predetermined voltage is selectively applied to each of the second cathodes 25 and each of the second anodes 26. The liquid crystal element G2 that is located at the intersecting portion of the second cathode 25 and the second anode 26 to which the voltage is applied is switched to block light.

The outside light that enters the display 11 via the display surface is transmitted through the liquid crystal 24 at only the portions corresponding to the liquid crystal elements G2 that are in the light-transmitting state. The outside light then reaches the first cathodes 19 and are reflected by the first cathodes 19. The reflected light is converted into either red, green, or blue at the color filters 15 and sent out from the display surface (see arrows indicated by heavy lines in FIG. 6).

When the display 11 is operating in the fourth operation mode, the electroluminescent elements G1 are maintained in the non-light-emitting state. That is, no voltage is applied to the first anodes 17 and the first cathodes 19.

Figure 7:
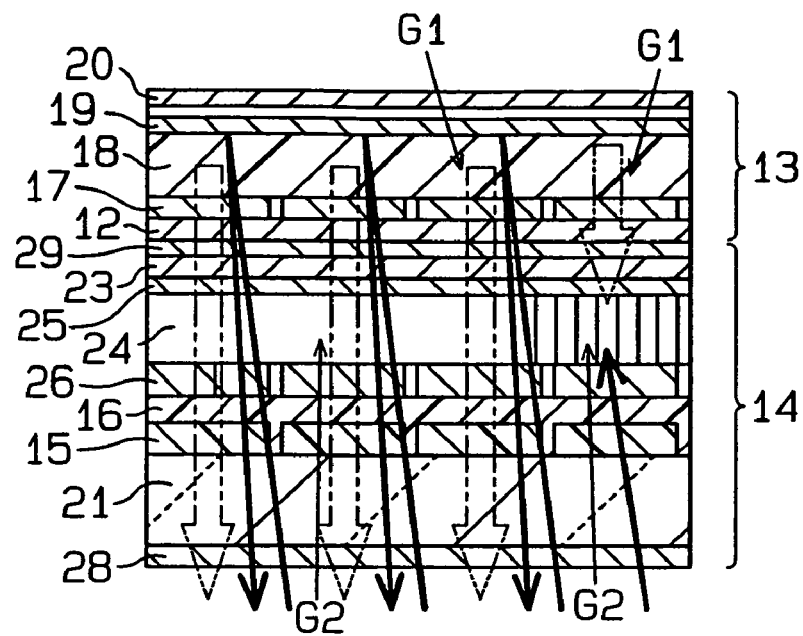
FIG. 7 is a partial cross-sectional view explaining the operation of a display shown in FIG. 5 in a fifth operation mode.

FIG. 7 shows a fifth operation mode of the display 11. In the fifth operation mode, the liquid crystal elements G2 function as pixels and the electroluminescent elements G1 function as a light source for the backlight that always emit light.

In the fifth operation mode, a predetermined voltage is applied to all the first anodes 17 and all the first cathodes 19. As a result, all the electroluminescent elements G1 emits white light. Therefore, the light emitted from the electroluminescent elements G1 is radiated at all the liquid crystal elements G2 (see arrows described in chain double-dashed lines shown in FIG. 7). The liquid crystal panel 14 is operated in the same manner as the fourth operation mode.

On the other hand, the outside light that enters the display 11 via the display surface is transmitted through the liquid crystal 24 at only the portions corresponding to the liquid crystal elements G2 that are in the light-transmitting state, and reaches the first cathodes 19. The light that reached the first cathodes 19 is reflected by the first cathodes 19. The reflected light is converted into either red, green, or blue at the color filters 15 together with the light emitted from the electroluminescent elements G1 toward the color filters 15, and sent out from the display surface (see arrows indicated by heavy lines in FIG. 7).

Figure 8:
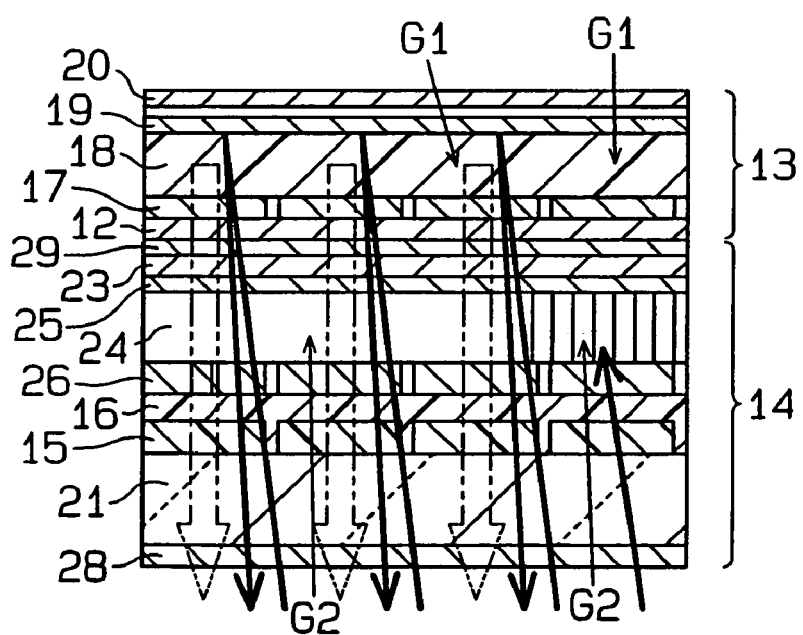
FIG. 8 is a partial cross-sectional view explaining the operation of a display shown in FIG. 5 in a sixth operation mode.

FIG. 8 illustrates a sixth operation mode of the display 11. In the sixth operation mode, the liquid crystal elements G2 function as pixels and the electroluminescent elements G1 function as a light source for the backlight that emits light as required. In other words, the electroluminescent elements G1 and the liquid crystal elements G2 both function as pixels.

In the sixth operation mode, voltage is selectively applied to each of the first anodes 17 and each of the first cathodes 19. Simultaneously, a predetermined voltage is applied to the second cathode 25 and the second anode 26 that correspond to the liquid crystal element G2 that is aligned with the electroluminescent element G1 that is in the non-light-emitting state in the front and rear direction of the display 11. Thus, the light emitted from the electroluminescent element G1 is only radiated at the liquid crystal elements G2 that are in the light-transmitting state (see arrows described in chain double-dashed lines in FIG. 8).

The outside light that enters the display 11 from the display surface is transmitted through the liquid crystal 24 at only the portions corresponding to the liquid crystal elements G2 that are in the light-transmitting state, and reaches the first cathodes 19. The light that reached the first cathodes 19 is reflected by the first cathodes 19. The reflected light is converted into either red, green, or blue at the color filters 15 together with the light emitted from the electroluminescent elements G1 toward the color filters 15 and sent out from the display surface (see arrows indicated by heavy lines in FIG. 8).

The second embodiment provides the following advantages.

In the fourth operation mode, the display 11 utilizes the outside light as a light source. Therefore, the display 11 has reduced power consumption under an environment where the lighting intensity is sufficient such as the outdoors.

In the fifth and sixth operation modes, the display 11 utilizes the light emitted from the electroluminescent elements G1 as a light source. Therefore, the display 11 shows a bright image that is easily visible on the display surface under an environment where the lighting intensity is insufficient such as the indoors or at night.

In the sixth operation mode, each electroluminescent element G1 emits light as required in accordance with the corresponding liquid crystal element G2. Therefore, the power consumption is reduced as compared to the fifth operation mode.

The electroluminescent elements G1 and the liquid crystal elements G2 are aligned with each other in the front and rear direction of the display 11. Therefore, in the fifth and sixth operation modes, each electroluminescent element G1 efficiently radiates light at the corresponding liquid crystal element G2.

It should be apparent to those skilled in the art that the present invention may be embodied in many other specific forms without departing from the spirit or scope of the invention. Particularly, it should be understood that the invention may be embodied in the following forms.

The electroluminescent elements G1 may be replaced with electroluminescent elements formed of inorganic electroluminescent material.

The electroluminescent panel 13 may be replaced with an electroluminescent panel that is driven by a system other than the passive matrix system, such as the active matrix system.

The liquid crystal panel 14 may be replaced with a liquid crystal panel that is driven by a system other than the passive matrix system, such as the active matrix system.

The electroluminescent elements G1 and the liquid crystal elements G2 need not be aligned with each other entirely in the front and rear direction of the display 11 as long as the electroluminescent elements G1 and the liquid crystal elements G2 are partially aligned with each other.

In the second embodiment, an image may be shown on the display surface by using the electroluminescent elements G1 as pixels as in the first operation mode of the first embodiment. In this case, no voltage is applied to the second cathodes 25 and the second anodes 26 so that all the liquid crystal elements G2 are in the light-transmitting state.

The display 11 may be designed to be able to adjust the brightness of each pixel. In this case, the display 11 can show a gray level image on the display surface.

Therefore, the present examples and embodiments are to be considered as illustrative and not restrictive and the invention is not to be limited to the details given herein, but may be modified within the scope and equivalence of the appended claims.

The invention claimed is:

1. A display, comprising:
   a display surface;
   an electroluminescent panel, the electroluminescent panel having a plurality of electroluminescent elements; and
   a liquid crystal panel, which overlaps the electroluminescent panel in a front and rear direction of the display, the liquid crystal panel includes a plurality of liquid crystal elements;
   the electroluminescent elements and the liquid crystal elements are aligned with each other in the front and rear direction of the display, and at least one of the electroluminescent elements and the liquid crystal elements function as pixels to show an image on the display surface, the display being designed to be able to adjust the brightness of each pixel,
   the liquid crystal panel being located at the rear of the display surface, and the electroluminescent panel being located at the rear of the liquid crystal panel,
   an electric field being applied to each electroluminescent element such that the electroluminescent element is selectively switched between a light-emitting state and a non-light-emitting state, and an electric field being applied to each liquid crystal element such that the liquid crystal element is selectively switched between a light-transmitting state and a light-blocking state,
   the electroluminescent panel reflecting light that enters from the display surface via the liquid crystal panel, and
   the electroluminescent elements being operated in accordance with the liquid crystal elements such that the electroluminescent element that corresponds to the liquid crystal element that is in the light-transmitting state is switched to the light-emitting state, and the electroluminescent element that corresponds to the liquid crystal element that is in the light-blocking state is switched to the non-light emitting state.

2. The display according to claim 1, further comprising a color filter to show a colored image on the display surface.

* * * * *